US008312517B2

United States Patent
Friedlander et al.

(10) Patent No.: US 8,312,517 B2
(45) Date of Patent: Nov. 13, 2012

(54) USER-ENTERED CREDENTIALS FOR A MOBILE STATION IN A WIRELESS NETWORK

(75) Inventors: Eran Friedlander, Kfar Saba (IL); Avishay Sharaga, Bet Nehemya (IL)

(73) Assignee: Intel Corporation, Santa Clara, CA (US)

( * ) Notice: Subject to any disclaimer, the term of this patent is extended or adjusted under 35 U.S.C. 154(b) by 269 days.

(21) Appl. No.: 12/873,015

(22) Filed: Aug. 31, 2010

(65) Prior Publication Data

US 2012/0054839 A1    Mar. 1, 2012

(51) Int. Cl.
G06F 21/00 (2006.01)
(52) U.S. Cl. .......................................................... 726/5
(58) Field of Classification Search .................. 726/5
See application file for complete search history.

(56) References Cited

OTHER PUBLICATIONS

International Search Report mailed Apr. 9, 2012 in International Application No. PCT/US2011/049486.
Butler, R. et al., "A national-scale authentication infrastructure," Computer, vol. 33, No. 12, pp. 60-66, Dec. 2000.
Sung, Dan Keun, "Mobile Communications Systems (MCS)," KAIST, 2000, 80 pages.
Blaze, M. et al., "Decentralized trust management," IEEE Symposium on Security and Privacy, pp. 164-173, May 6-8, 1996.
"WiMAX Over-The-Air Provisioning & Activation Protocol based on OMA DM Specifications," Draft-T33-104-R016v01-F, Draft Specification, May 18, 2010, WiMAX Forum Network Architecture, WiMAX Forum Proprietary, 2007-2010.

*Primary Examiner* — Farid Homayounmehr
*Assistant Examiner* — Lisa Lewis
(74) *Attorney, Agent, or Firm* — Schwabe, Williamson & Wyatt, P.C.

(57) ABSTRACT

Embodiments of the present disclosure describe method, apparatus, and system configurations to provide user-entered credentials for a mobile station in a wireless network. A method includes receiving, by one or more service provider devices of a wireless network from a mobile station, an indication that the mobile station is ready for activation in the wireless network and sending, by the one or more service provider devices to the mobile station during a subscription process that is performed in response to the indication that the mobile station is ready for activation, a message prompting or indicating a creation of credentials to be entered by a user of the mobile station to authenticate the mobile station on re-entry to the wireless network. Other embodiments may be described and/or claimed.

16 Claims, 6 Drawing Sheets

USER-ENTERED CREDENTIALS FOR A MOBILE STATION IN A WIRELESS NETWORK

FIELD

Embodiments of the present disclosure generally relate to the field of wireless communication systems, and more particularly, to methods, apparatus, and system configurations to provide user-entered credentials for a mobile station in a wireless network.

BACKGROUND

Mobile networks that facilitate transfer of information at broadband rates continue to be developed and deployed. Such networks may be colloquially referred to herein as broadband wireless access (BWA) networks and may include networks operating in conformance with one or more protocols specified by the 3$^{rd}$ Generation Partnership Project (3GPP) and its derivatives, the WiMAX Forum, or the Institute for Electrical and Electronic Engineers (IEEE) 802.16 standards (e.g., IEEE 802.16-2005 Amendment), although the embodiments discussed herein are not so limited. IEEE 802.16 compatible BWA networks are generally referred to as WiMAX networks, an acronym that stands for Worldwide Interoperability for Microwave Access, which is a certification mark for products that pass conformity and interoperability tests for the IEEE 802.16 standards.

A variety of different device types may be used in broadband wireless technologies. Such devices may include, for example, personal computers, handheld devices, and other consumer electronics such as music players, digital cameras, etc., that are configured to communicate over the wireless broadband networks.

Currently operators of BWA networks use only server-configured/controlled credentials to authenticate a user prior to enabling a user's device to connect with the BWA network.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
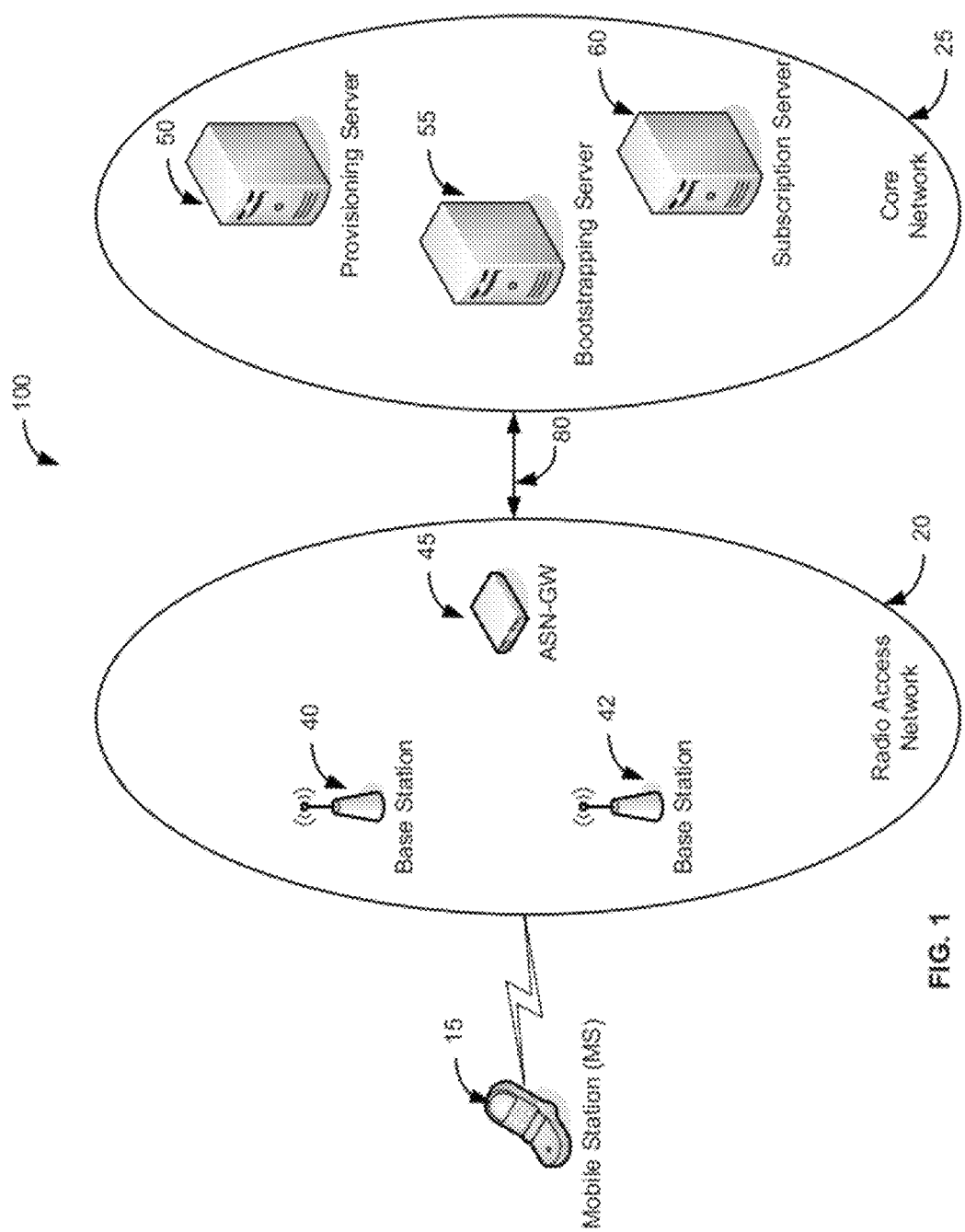
FIG. 1 schematically illustrates an example broadband wireless access (BWA) network architecture in accordance with some embodiments.

Embodiments of the present disclosure provide method, apparatus, and system configurations to provide user-entered credentials for a mobile station in a wireless network. In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

While example embodiments may be described herein in relation to broadband wireless access for wireless metropolitan area networks (WMANs) such as WiMAX networks, embodiments of the present disclosure are not limited thereto and can be applied to other types of wireless networks where similar advantages may be obtained. Such networks include, but are not limited to, wireless local area networks (WLANs), wireless personal area networks (WPANs) and/or wireless wide area networks (WWANs) such as cellular networks and the like.

The following embodiments may be used in a variety of applications including transmitters and receivers of a mobile wireless radio system. Radio systems specifically included within the scope of the embodiments include, but are not limited to, network interface cards (NICs), network adaptors, base stations, access points (APs), gateways, bridges, hubs and satellite radiotelephones. Further, the radio systems within the scope of embodiments may include satellite systems, personal communication systems (PCS), two-way radio systems, global positioning systems (GPS), two-way pagers, personal computers (PCs) and related peripherals, personal digital assistants (PDAs), personal computing accessories and all existing and future arising systems which may be related in nature and to which the principles of the embodiments could be suitably applied.

FIG. 1 schematically illustrates an example broadband wireless access (BWA) network 100 in accordance with some embodiments. The BWA network 100 may be a network of a service provider or operator having one or more radio access networks (RANs) 20 and a core network 25.

A mobile station (MS) 15 may access the core network 25 via a radio link with a base station (BS) (e.g. BS 40, 42, etc.) in the RAN 20. The MS 15 may, for example, be a subscriber station seeking activation using protocols compatible with the IEEE 802.16 standards (e.g., IEEE 802.16-2005 Amendment) or WiMAX standards, such as Network Working Group (NWG) Rel 1.5 Standard or variants thereof. The base stations 40, 42 may be configured to wirelessly advertise a service provider to the MS 15. While FIG. 1 generally depicts the MS 15 as a cellular phone, in various embodiments the MS 15 may be a notebook, an ultra mobile PC (UMPC), a handheld mobile device, an universal integrated circuit card (UICC), a personal digital assistant (PDA), a Customer Premise Equipment (CPE), or other consumer electronics such as MP3 players, digital cameras, and the like.

In some embodiments, communication with the MS 15 via RAN 20 may be facilitated via one or more access service network gateways (ASN-GWs) 45, although the embodiments are not limited to this specific type of network implementation. ASN-GW 45 (or another similar type of network node) may act as an interface between the core network 25 and its RANs 20. Thus, ASN-GW 45 may be connected to a plurality of base stations 40, 42 and may function as a type of BS controller and/or mobile switching center (MSC) to facilitate handover control and other functions for RAN 20, although the embodiments are not so limited. In a WiMAX setting, the RAN 20 may comprise an access service network (ASN) of a Network Access Provider (NAP) and the core network 25 may comprise a connectivity service network (CSN) of a Network Service Provider (NSP).

The core network 25 may include logic (e.g., a module) to provide activation of the MS 15 or other actions associated with subscription. For example, the core network 25 may include a provisioning server 50, a bootstrapping server 55, and/or a subscription server 60. Thus, one or more servers 50, 55, 60 associated with the service provider may be communicatively coupled to the base stations 40, 42. The one or more servers 50, 55, 60 may be over-the-air (OTA) servers that are configured to direct one or more MSes, e.g., MS 15, connected to the BWA network 100 to a subscription portal and provision the one or more MSes.

In some embodiments, the logic associated with the different functionalities of the depicted servers 50, 55, 60 may be combined to reduce the number of servers, including, for example, being combined in a single machine or module. Although not shown, the core network 25 may further include several other components, such as an authentication, authorization, and accounting (AAA) server or Home Agent (HA).

Figure 2:
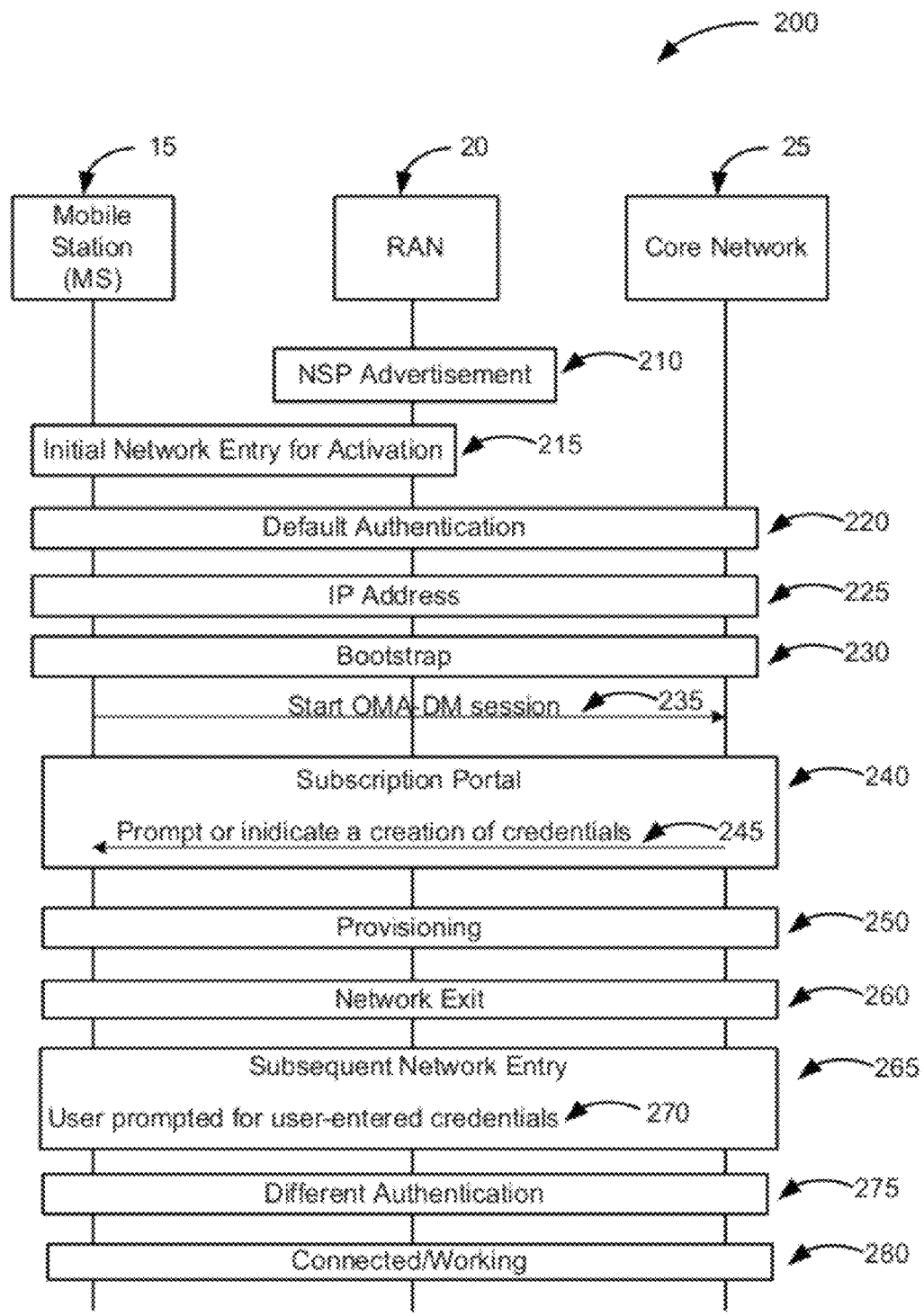
FIG. 2 schematically illustrates an example flow to configure a mobile station to operate using user-entered credentials for a wireless network in accordance with some embodiments.

FIG. 2 schematically illustrates an example flow 200 to configure a mobile station MS 15 to operate using user-entered credentials for a wireless network (e.g., BWA network 100 of FIG. 1) in accordance with some embodiments. Referring to FIGS. 1 and 2, a transmitter (e.g., the BS 40) of the wireless network may wirelessly broadcast an advertisement for a network service provider (NSP) at 210.

At 215, an MS 15 may initially enter the service provider's wireless network at 215. A variety of operations may be performed to accommodate the initial network entry. For example, the MS 15 may perform actions associated with network discovery and selection (ND&S), such as scanning and detecting the advertised NSP. A user of the MS 15 may choose to connect to the advertised NSP. The MS 15 may be a non-provisioned subscriber station of the advertised NSP.

The MS 15 may indicate that it is ready for activation in the wireless network. For example, the non-provisioned MS 15 may be configured with various parameters that trigger an activation process. For example, in a WiMAX setting, the MS 15 may configure a Network Access Identifier (NAI) to {sm=1}MAC@[realm], where the [realm] portion identifies the NSP. Such information associated with the NAI can be sent, for example, by the MS 15 in a message to the service provider or otherwise retrieved/received by the service provider to indicate that the MS 15 is ready for activation in the wireless network.

At 220, a default authentication exchange may be performed to authenticate the MS 15 in the wireless network. According to various embodiments, the default authentication exchange between the MS 15 and the wireless network does not allow a user of the mobile station to enter credentials to authenticate the MS 15 in the wireless network. The default authentication may be performed using, for example, Extensible Authentication Protocol (EAP), which may be set to Transport Layer Security (TLS) as for activation. That is, according to some embodiments, the default authentication at 220 includes using EAP-TLS to authenticate the MS 15.

At 225, the MS 15 may obtain an internet protocol (IP) address to establish a data path with one or more servers of the service provider. The activation process may use IP to exchange information between the MS 15 and the one or more servers. The IP address may be provided, for example, by a server in a connectivity service network (CSN) of the BWA network 100 using a Dynamic Host Configuration Protocol (DHCP). Other configurations and/or protocols may be supported.

At 230, the MS 15 may further engage in a bootstrapping sequence. The bootstrapping may be triggered, for example, by configuration parameters (e.g., setting NAI to {sm=1}) that indicate that the MS 15 is not provisioned or that otherwise indicate that the MS 15 is not activated and/or ready for activation. For example, the ASN-GW 45 of the BWA network 100 or other similar functioning device or module may hot-line the MS 15 to the bootstrapping server 55 of the one or more OTA servers. Through hot-lining, the MS 15 may be directed to, and be able to access the bootstrapping server 55 to exchange bootstrap information. The bootstrap 230 may be performed according to a specification or standard in accordance with Open Mobile Alliance Device Management (OMA-DM), such as version 1.2 of the OMA-DM specification released in April 2006 or variants thereof. At 235, the MS 15 may start or send a message indicative of starting an OMA-DM session between the MS 15 and the provisioning server 50 and/or the subscription server 60. The OMA-DM session may be used to facilitate subscription services at the subscription portal 240 and/or provisioning the MS 15 at 250. That is, a subscription process and/or provisioning may be managed by the provisioning server 50 and/or the subscription server 60, which may have OMA-DM capability.

At 240, the MS 15 may be directed to a subscription portal to complete a subscription process of the service provider. The subscription portal 250 may provide subscription services via Hypertext Transfer Protocol (HTTP) or any other suitable protocol. For example, the subscription server 60 or other logic/module having similar functionality may provide web-based subscription services via a web browser of the MS 15. Upon being directed to the subscription portal 240, a user of the MS 15 may exchange information with the subscription server 60 to create a user account with the service provider.

According to various embodiments, during the subscription process, the service provider sends a message to the MS 15 to prompt or indicate a creation of credentials to be entered by a user of the mobile station at 245. The service provider may send the message using, for example, the provisioning server 50, the subscription server 60, or a device/module having similar functionality. For example, according to some embodiments, the service provider prompts the user of the mobile station to create the credentials via HTTP using, for example, a web portal used for the subscription process. In other embodiments, the service provider creates credentials to be entered by a user of the mobile station and sends the credentials to the user using a medium, such as, for example, email, short message service (SMS), web portal, phone call, or any other suitable medium that is not used to transmit control messages to the MS 15 on behalf of the wireless network. Combinations of these techniques can be used in some embodiments. For example, the user of the MS 15 may create the credentials during the subscription process and the service provider may subsequently send the credentials to the user using email, SMS, web portal, or a phone call. According to various embodiments, the credentials include a username and password. The credentials may be used to authenticate the MS 15 to the service provider on subsequent re-entry of the MS 15 to the wireless network of the service provider.

At 250, provisioning of the MS 15 may occur. The provisioning may be performed in response to the indication by the MS 15 that it is ready for activation in the wireless network. For example, the provisioning server 50 may provision the MS 15 with configuration parameters and/or instructions to be executed by the MS 15 that cause the MS 15 to perform a different (e.g., updated) authentication exchange (e.g., at 275) that allows the credentials to be entered by the user on re-entry (e.g., at 265) of the MS 15 to the wireless network of the service provider. The different authentication exchange is referred to as "different" because it is not the same as the default authentication used to initially authenticate the MS 15. For example, the provisioning server 50 may update an EAP management object (MO) associated with the subscription to control the type of authentication used by the MS 15. The MS 15 may be provisioned to perform a different authentication exchange, such as EAP authentication using Tunneled Transport Layer Security (EAP-TTLS) with a Challenge Handshake Authentication Protocol (CHAP), which is compatible with a network entry scheme where the credentials are entered by the user. For example, the different authentication exchange may be compatible with Microsoft CHAP, version 1 or version 2 (e.g., MS-CHAP v1 or v2), or subsequent versions that allow credentials to be entered by the user.

Figure 3:
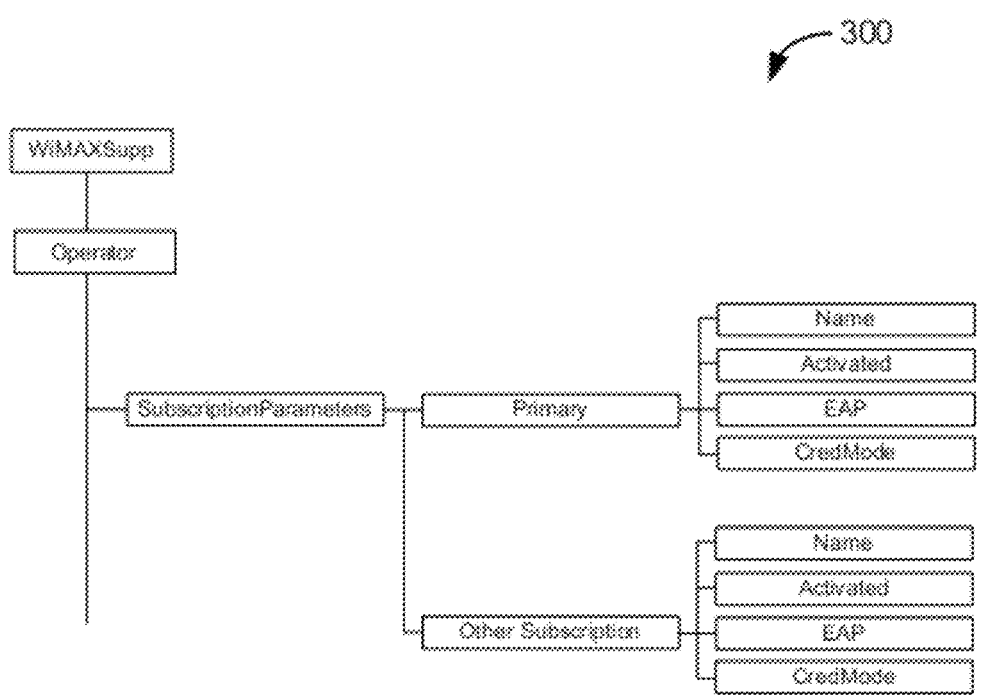
FIG. 3 schematically illustrates an example parameter tree stored in the mobile station in accordance with some embodiments.

The provisioning at 250 may further include configuring a parameter of the MS 15 to a user-controlled (UC) mode to indicate that the MS 15 is configured to enter the wireless network using credentials entered by the user. For example, referring to FIG. 3 and also FIGS. 1-2, a node for a credentials mode (e.g., CredMode) may be added to a subscription parameters node (e.g., Subscription Parameters) of a parameter tree 300 stored in the MS 15, as depicted. The parameter tree 300 may be a WiMAX OMA-DM tree in some embodiments.

The CredMode node may be added under a node for a primary subscription (e.g., Primary) of the MS 15 and/or under a node for other subscriptions (e.g., Other Subscription) of the MS 15 to allow selection by the service provider of either the UC mode or a server-controlled (SC) mode for different subscriptions on the same MS 15. The SC mode may be a default mode for service providers. In the SC mode, credentials are entered/controlled by a server of the service provider. That is, in the SC Mode, credentials are not entered by a user of the MS 15.

The CredMode node allows a service provider/operator to select either a UC or SC mode for credentials of subscribers. To be clear, a first user of the primary subscription can use the MS 15 in a UC mode as provisioned by a service provider for the primary subscription and a second user of another subscription can use the same MS 15 in a SC mode as provisioned by the service provider for the other subscription. Thus, the CredMode node provides flexibility to service providers/operators to select a user-controlled or server-controlled credentials policy or mode for subscribers in general. Additionally, the CredMode node allows a single service provider/operator to select a user-controlled or server-controlled credentials policy for different subscriptions on the same MS 15. The MS 15 may be pre-configured with the non-provisioned CredMode node prior to being sold to an end user of the MS 15. The CredMode node may be provisioned with a UC or SC value during provisioning at 250 of an initial network entry of the MS 15 as described in connection with flow 200.

The wireless network may behave as follows for the following described conditions. According to one example, if the MS 15 is provisioned to use an authentication method (e.g., EAP-TLS) that does not allow for user-entered credentials, then the CredMode node may be ignored by the wireless network and the service provider may default to using a server-controlled mode for credentials of the subscription. In another example, if the MS 15 is provisioned to use an authentication method (e.g., EAP-TTLS with MS-CHAP v2) that allows for user-entered credentials and the CredMode is provisioned with a value of UC, then the user-controlled mode for credentials may be used and the server-controlled mode may be disabled. The user-controlled mode may be used in this case even if server-configured credentials (e.g., username/password) exist in a server-configured credentials node stored in the MS 15. In another example, if the MS 15 is provisioned with an authentication method (e.g., EAP-TTLS with MS-CHAP v2) that allows for user-entered credentials and the CredMode node does not exist on the MS 15 or contains reserved values, then the server-controlled mode for credentials may be used. In general, the server-controlled mode may be used as a default for the wireless network of the service provider.

As depicted in the parameter tree 300, the node for the primary subscription and the node for the other subscription may further include additional nodes for a name (e.g., Name) associated with the respective subscription, an active/inactive status of the respective subscription (e.g., Activated), and/or a type of authentication (e.g., EAP) that is configured to authenticate the respective subscriptions. The parameter tree 300 can include more or fewer nodes than depicted in other embodiments.

Returning to FIGS. 1-2, at 260, the MS 15 may exit the wireless network subsequent to provisioning. In some embodiments, the provisioning server 50 disconnects the MS 15 from the wireless network.

At 265, the MS 15 performs a subsequent network entry to the wireless network of the service provider. The MS 15 may perform network re-entry operations such as ND&S. As described above, the MS 15 has already been provisioned with the different authentication method (e.g., EAP-TTLS with MS-CHAP v2) and the UC mode.

At 270, a user of the MS 15 is prompted for the user-entered credentials prior to re-connecting the MS 15 to the wireless network. The MS 15 may be configured with instructions during provisioning at 250, that when executed, run an application that prompts the user for the user-entered credentials. For example, the user can be prompted to enter the credentials when the user selects the service provider for connection, prior to the MS 15 performing additional operations associated with network entry. The application that prompts the user for the user-entered credentials can be triggered by various other actions performed by the MS 15, which may be performed in response to various messages received from the service provider during subsequent network entry at 265 or during the different authentication exchange at 275.

At 275, the provisioned authentication method is used to perform the different authentication exchange using the user-entered credentials. At 280, the MS 15 establishes a working connection with the wireless network after performing the different authentication exchange.

To be clear, other authentication scenarios may be used that also allow the user to enter the credentials based on the service provider/operator policy. For example, in some embodiments, the MS 15 may be configured to use an authentication method that requires user-entered credentials, such as EAP-TTLS with MS-CHAP v2, and may be further configured to use the SC mode such that the user does not enter the credentials. Subsequent to being configured in this manner, the MS 15 may be provisioned by the service provider (e.g., ongoing provisioning) to change the mode from SC mode to UC mode on the MS 15. In this regard, according to some of these embodiments, the default authentication (e.g., at 220) for initial network entry (e.g., at 215) and the different authentication (e.g., at 275) may use the same authentication. Other embodiments that suitably combine these principles with embodiments described for the flow 200 can be used.

Figure 4:
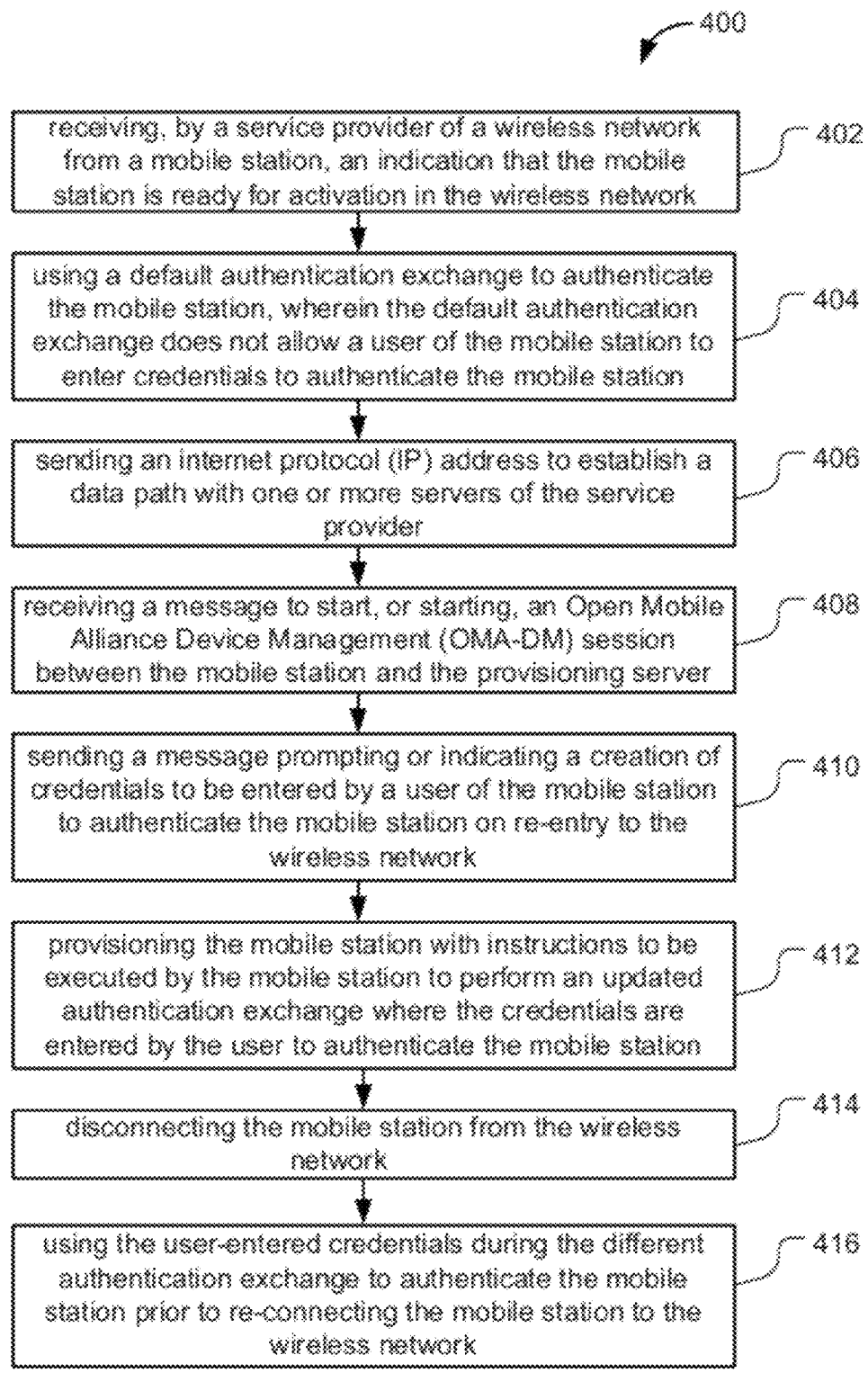
FIG. 4 is a flow diagram of a method for configuring a mobile station to operate using user-entered credentials in accordance with some embodiments.

FIG. 4 is a flow diagram of a method 400 for configuring a mobile station (e.g., MS 15 of FIGS. 1-2) to operate using user-entered credentials in accordance with some embodiments. Generally, the actions of method 400 are performed by one or more devices of a service provider of a wireless network (e.g., BWA network 100 of FIG. 1). In various embodiments, the one or more devices of the service provider include one or more servers such as one or more OTA servers (e.g., one or more servers 50, 55, 60 of the BWA network 100 of FIG. 1), one or more base stations and/or network nodes (e.g., BSes 40, 42 and/or ASN-GW 45 of the BWA network 100 of FIG. 1), or other devices/modules that send or relay information for the service provider as described herein.

At 402, the method 400 includes receiving, by a service provider of a wireless network from a mobile station, an indication that the mobile station is ready for activation in the wireless network. The indication may be received, for example, by one or more servers and/or relayed by one or more BSes of the wireless network. In a WiMAX setting, the mobile station may configure a Network Access Identifier (NAI) to {sm=1}MAC@[realm], where the [realm] portion identifies the network service provider. Such information associated with the NAI can be sent, for example, by the mobile station in a message to the service provider or otherwise retrieved/received by the service provider to indicate that the mobile station is ready for activation in the wireless network.

At 404, the method 400 further includes using a default authentication exchange (e.g., using EAP-TLS) to authenticate the mobile station. The default authentication exchange can be used, for example, by one or more servers and/or relayed by one or more BSes of the wireless network. According to various embodiments, the default authentication exchange does not allow a user of the mobile station to enter credentials to authenticate the mobile station.

At 406, the method 400 further includes sending an internet protocol (IP) address to the mobile station for the mobile station to establish a data path with one or more servers of the service provider using the IP address. The IP address may be provided, for example, by a server in a connectivity service network (CSN) of the BWA network 100 using a Dynamic Host Configuration Protocol (DHCP). Other configurations and/or protocols may be supported.

At 408, the method 400 further includes receiving a message from the mobile station to start, or starting, an OMA-DM session between the mobile station and the provisioning server. The message can be received or the OMA-DM session can be started, for example, by one or more OTA servers. The OMA-DM session may be used facilitate a subscription process and/or provisioning of the mobile station. That is, the subscription process and/or the provisioning may be managed by a provisioning server (e.g., 50 of FIG. 1), such as an OMA-DM server, during the OMA-DM session. According to various embodiments, the subscription process is performed (e.g., the OMA-DM session is started) in response to the indication that the mobile station is ready for activation.

At 410, the method 400 further includes sending a message to the mobile station prompting or indicating a creation of credentials to be entered by a user of the mobile station to authenticate the mobile station on re-entry to the wireless network. The message can be sent, for example, by one or more OTA servers of the service provider. According to some embodiments, the service provider prompts the user of the mobile station to create the credentials via HTTP using, for example, a web portal used for the subscription process. In other embodiments, the service provider creates credentials to be entered by a user of the mobile station and sends the credentials to the user using a medium, such as, for example, email or short message service (SMS), web portal, phone call, or any other suitable medium that is not used to transmit control messages to the MS 15 on behalf of the wireless network.

Combinations of these techniques can be used in some embodiments. For example, the user of the MS 15 may create the credentials during the subscription process and the service provider may subsequently send the credentials to the user using email, SMS, web portal, or a phone call. According to various embodiments, the credentials include a username and password. The message at 410 may be sent during the OMA-DM session, such as during the subscription process.

At 412, the method 400 further includes provisioning the mobile station with instructions to be executed by the mobile station to perform a different authentication exchange (e.g., EAP-TTLS with MS-CHAP v2) where the credentials are entered by the user to authenticate the mobile station. The provisioning may further include configuring a parameter of the mobile station to a user-controlled (UC) mode to indicate that the mobile station is configured to enter the wireless network with the credentials entered by the user. The provisioning may be performed, for example, by a provisioning server 50 of the one or more OTA servers.

At 414, the method 400 further includes disconnecting the mobile station from the wireless network. The mobile station may be disconnected, for example, by the provisioning server 50 subsequent to provisioning the mobile station at 412.

At 416, the method 400 further includes using the user-entered credentials during the different authentication exchange (e.g., EAP-TTLS with MS-CHAP v2) to authenticate the mobile station prior to re-connecting the mobile station to the wireless network. A user of the mobile station may be prompted to enter the credentials, for example, in response to a message sent by one or more servers (e.g., an authentication server) of the service provider to the mobile station during subsequent network entry (e.g., at 265 of FIG. 2) or during the different authentication (e.g., at 275 of FIG. 2). The user may enter the credentials. The service provider may use the credentials to authenticate the mobile station during the different authentication exchange. The different authentication exchange can be used, for example, by a server (e.g., an authentication server) of the service provider.

Figure 5:
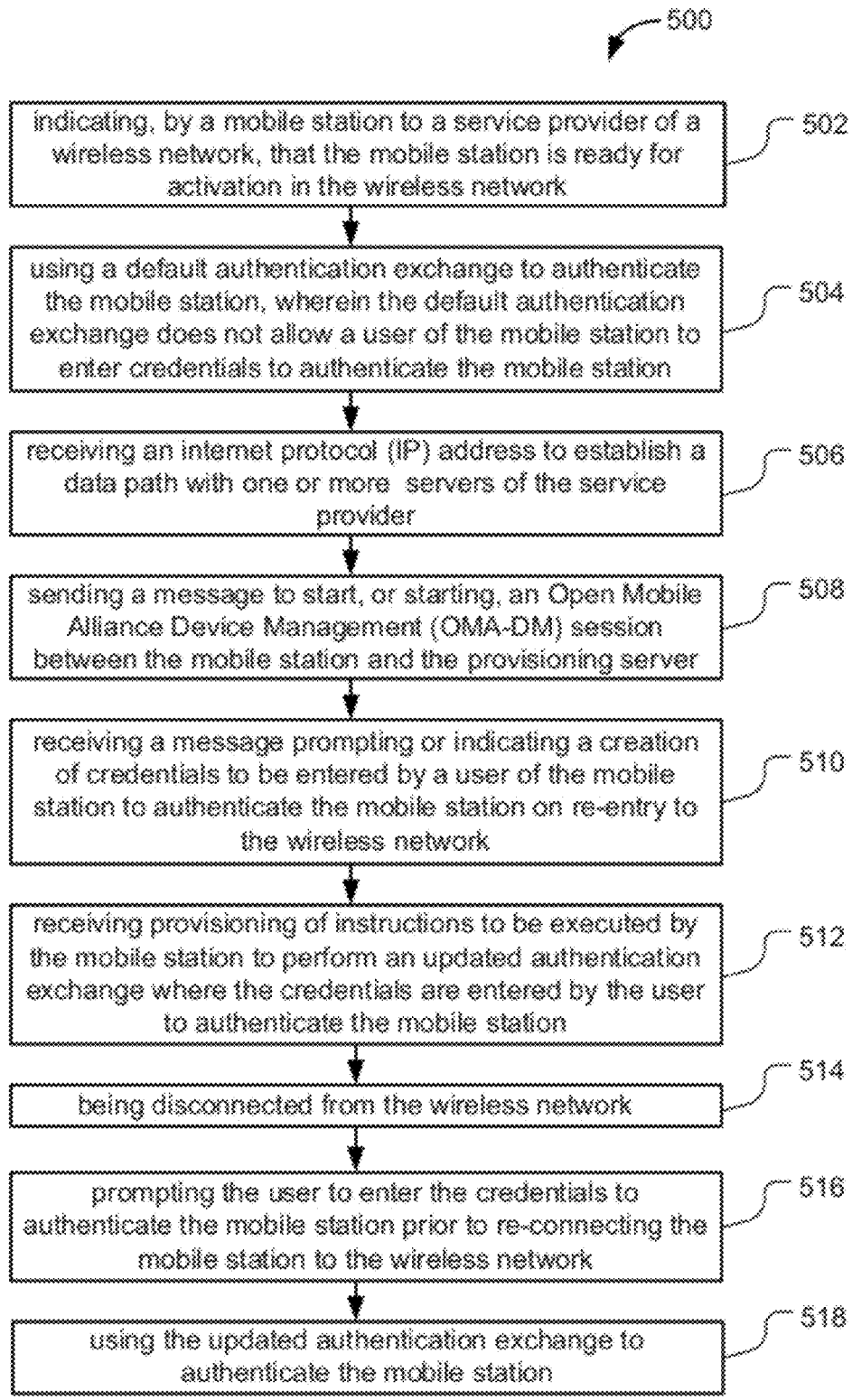
FIG. 5 is a flow diagram of another method for configuring a mobile station to operate using user-entered credentials in accordance with some embodiments.

FIG. 5 is a flow diagram of another method 500 for configuring a mobile station to operate using user-entered credentials in accordance with some embodiments. Generally, the actions of method 500 are performed by a mobile station (e.g., MS 15 of FIGS. 1-2) of a wireless network (e.g., BWA network 100 of FIG. 1).

At 502, the method 500 includes indicating, by a mobile station to a service provider of a wireless network, that the mobile station is ready for activation in the wireless network. In a WiMAX setting, the mobile station may configure a Network Access Identifier (NAI) to {sm=1}MAC@[realm], where the [realm] portion identifies the network service provider. Such information associated with the NAI can be sent, for example, by the mobile station in a message to the service provider or otherwise retrieved/received by the service provider to indicate that the mobile station is ready for activation in the wireless network.

At 504, the method 500 further includes using a default authentication exchange (e.g., using EAP-TLS) to authenticate the mobile station. According to various embodiments, the default authentication exchange does not allow a user of the mobile station to enter credentials to authenticate the mobile station.

At 506, the method 500 further includes receiving an internet protocol (IP) address to establish a data path with one or more servers of the service provider using the IP address. The IP address may be provided, for example, by a server in a connectivity service network (CSN) of the BWA network 100 using a Dynamic Host Configuration Protocol (DHCP). Other configurations and/or protocols may be supported.

At 508, the method 500 further includes sending a message to start or starting an OMA-DM session between the mobile station and the provisioning server. The OMA-DM session may be used facilitate a subscription process and/or provisioning of the mobile station. That is, the subscription process and/or the provisioning may be managed by a provisioning server (e.g., 50 of FIG. 1) such as an OMA-DM server during the OMA-DM session. According to various embodiments, the subscription process is performed (e.g., the OMA-DM session is started) in response to the indication that the mobile station is ready for activation.

At 510, the method 500 further includes receiving a message prompting or indicating a creation of credentials to be entered by a user of the mobile station to authenticate the mobile station on re-entry to the wireless network. For example, according to some embodiments, the service provider prompts the user of the mobile station to create the credentials via HTTP using, for example, a web portal used for the subscription process. In other embodiments, the service provider creates credentials to be entered by a user of the mobile station and sends the credentials to the user using a medium, such as, for example, email or short message service (SMS), web portal, phone call, or any other suitable medium that is not used to transmit control messages to the MS 15 on behalf of the wireless network.

Combinations of these techniques can be used in some embodiments. For example, the user of the MS 15 may create the credentials during the subscription process and the service provider may subsequently send the credentials to the user using email, SMS, web portal, or a phone call. According to various embodiments, the credentials include a username and password. The message at 510 may be received during the OMA-DM session, such as during the subscription process.

At 512, the method 500 further includes receiving provisioning of instructions to be executed by the mobile station to perform a different authentication exchange (e.g., EAP-TTLS with MS-CHAP v2) where the credentials are entered by the user to authenticate the mobile station. The provisioning may further include configuring a parameter of the mobile station to a user-controlled (UC) mode to indicate that the mobile station is configured to enter the wireless network with the credentials entered by the user. The provisioning may be performed by a provisioning server of the one or more OTA servers.

At 514, the method 500 further includes being disconnected from the wireless network. The mobile station may be disconnected subsequent to being provisioned at 512.

At 516, the method 500 further includes prompting the user to enter the credentials to authenticate the mobile station prior to re-connecting the mobile station to the wireless network. The prompt to enter the credentials may be triggered during subsequent re-entry of the mobile station to the wireless network. The user of the mobile station may enter the credentials in response to the prompt.

At 518, the method 500 further includes using the different authentication exchange (e.g., EAP-TTLS with MS-CHAP v2) to authenticate the mobile station. The different authentication exchange may use the credentials entered by the user for authentication.

Figure 6:
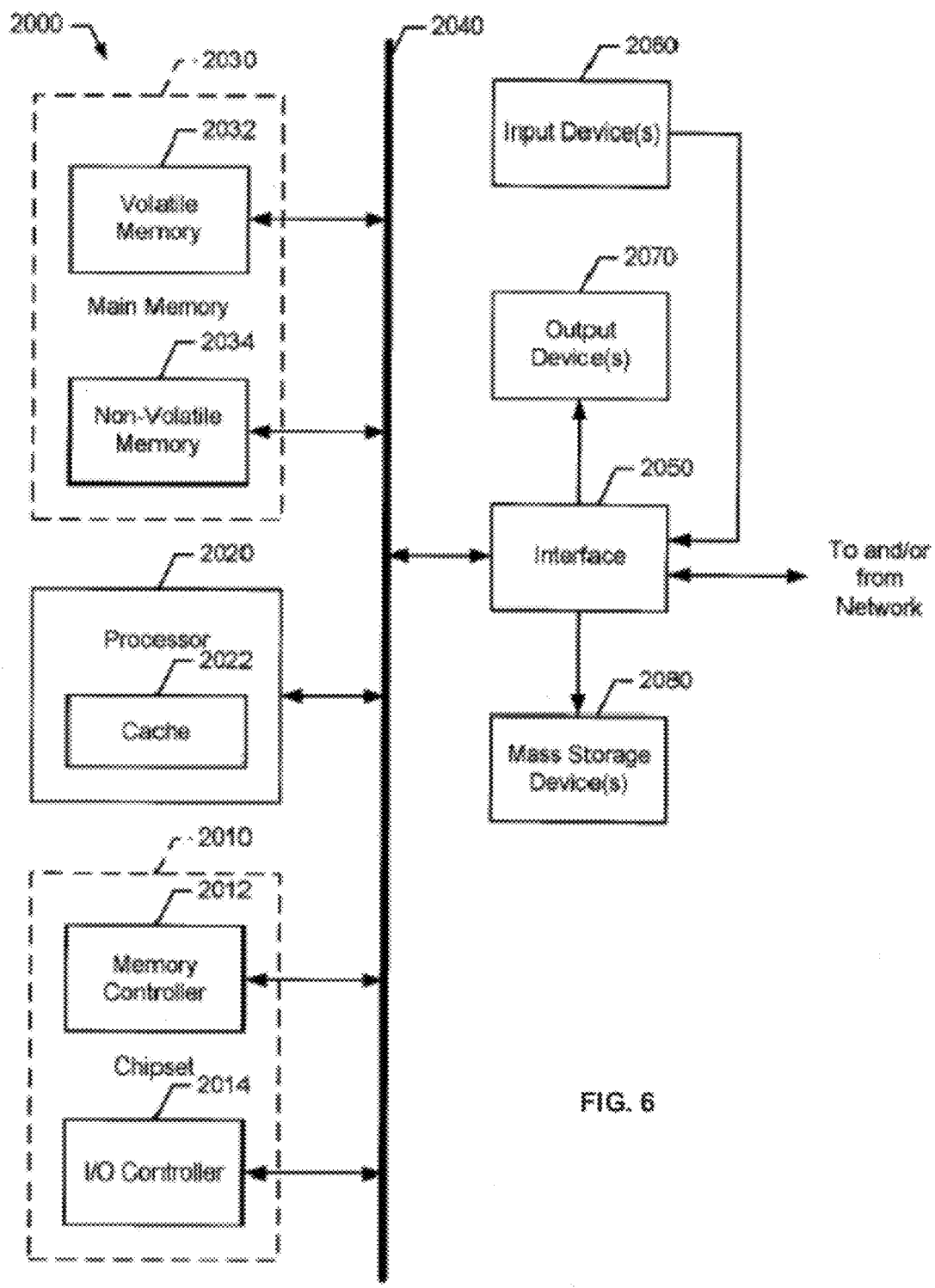
FIG. 6 schematically illustrates an example processor based system that may be used to practice various embodiments described herein.

FIG. 6 schematically illustrates an example processor-based system that may be used to practice various embodiments described herein. The processor system 2000 may be a desktop computer, a laptop computer, a handheld computer, a tablet computer, a PDA, a server, an Internet appliance, and/or any other type of computing device. In some embodiments, the processor system 2000 may be capable of functioning as the MS 15, the provisioning server 50, the bootstrapping server 55, and/or the subscription server 60 or provide logic/module that performs functions as described for the MS 15 or a service provider of a wireless network (e.g., BWA network 100).

The processor system 2000 illustrated in FIG. 6 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. The processor 2020 may include a cache 2022, which may be implemented using a first-level unified cache (L1), a second-level unified cache (L2), a third-level unified cache (L3), and/or any other suitable structures to store data. The processor 202 may be configured to communicate with a mobile station via a base station of a wireless network in some embodiments.

The memory controller 2012 may perform functions that enable the processor 2020 to access and communicate with a main memory 2030 including a volatile memory 2032 and a non-volatile memory 2034 via a bus 2040. While FIG. 6 shows a bus 2040 to communicatively couple various components to one another, other embodiments may include additional/alternative interfaces.

The volatile memory 2032 may be implemented by synchronous dynamic random access memory (SDRAM), dynamic random access memory (DRAM), RAMBUS dynamic random access memory (RDRAM), and/or any other type of random access memory device. The non-volatile memory 2034 may be implemented using flash memory, read only memory (ROM), electrically erasable programmable read only memory (EEPROM), and/or any other desired type of memory device.

An article of manufacture is disclosed herein. The article of manufacture may include a computer-readable medium having instructions stored thereon, that if executed, result in the actions described herein. The computer-readable medium may include, for example, components of main memory 2030 and/or the mass storage device(s) 2080 or any other suitable storage medium.

The processor system 2000 may also include an interface circuit 2050 that is coupled to the bus 2040. The interface circuit 2050 may be implemented using any type of interface standard such as an Ethernet interface, a universal serial bus (USB), a third generation input/output interface (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

In some embodiments, the processor system 2000 may be coupled to an antenna structure (not shown in the figure) to provide access to other devices of a network. In some embodiments, the antenna structure may include one or more directional antennas, which radiate or receive primarily in one direction (e.g., for 120 degrees), cooperatively coupled to one another to provide substantially omnidirectional coverage; or one or more omnidirectional antennas, which radiate or receive equally well in all directions. In some embodiments, the antenna structure may include one or more directional and/or omnidirectional antennas, including, e.g., a dipole antenna, a monopole antenna, a patch antenna, a loop antenna, a microstrip antenna or any other type of antennas suitable for OTA transmission/reception of RF signals.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 6 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A method comprising:
receiving, by one or more service provider devices of a wireless network from a mobile station, an indication that the mobile station is ready for activation in the wireless network;
sending, by the one or more service provider devices to the mobile station during a subscription process that is performed in response to the indication that the mobile station is ready for activation, a message prompting or indicating a creation of credentials to be entered by a user of the mobile station to authenticate the mobile station on re-entry to the wireless network; and
provisioning, by a provisioning server of the one or more service provider devices, the mobile station with instructions to be executed by the mobile station to perform an authentication exchange that is compatible with a network entry scheme where the credentials are entered by the user, wherein said provisioning further comprises configuring a parameter of the mobile station to a user-controlled (UC) mode to indicate that the mobile station is configured to enter the wireless network with the credentials entered by the user using, by the service provider, another authentication exchange to authenticate the mobile station prior to said sending the message prompting or indicating a creation of credentials, wherein the another authentication exchange is a default that does not allow a user of the mobile station to enter the credentials.

2. The method of claim 1, further comprising:
receiving, from the mobile station, a message to start an Open Mobile Alliance Device Management (OMA-DM) session between the mobile station and the provisioning server;
wherein said sending the message prompting or indicating the creation of credentials and said provisioning the mobile station with instructions are performed during the OMA-DM session.

3. The method of claim 1, wherein the authentication exchange is compatible with an Extensible Authentication Protocol Tunneled Transport Layer Security (EAP-TTLS) with a Challenge Handshake Authentication Protocol (CHAP), the method further comprising:
disconnecting, by the provisioning server, the mobile station from the wireless network.

4. The method of claim 1, wherein said sending the message prompting the creation of credentials comprises prompting the user of the mobile station to create the credentials via Hypertext Transfer Protocol (HTTP); and wherein the credentials comprise a username and a password.

5. The method of claim 1, wherein said sending the message indicating the creation of credentials comprises sending the credentials to the user using a medium other than a medium that is used to transmit control messages to the mobile station for the wireless network; and wherein the credentials comprise a username and a password.

6. An apparatus comprising:

an antenna;

a processor configured to communicate with a base station of a wireless network via the antenna; and a storage medium coupled to the processor, the storage medium having instructions stored thereon, that if executed by the processor, result in:

indicating, by the apparatus to a service provider of the wireless network, that the apparatus is ready for activation in the wireless network;

receiving, by the apparatus from the service provider during a subscription process that is performed in response to the indication that the mobile station is ready for activation, a message prompting or indicating a creation of credentials to be entered by a user of the apparatus to authenticate the apparatus on re-entry to the wireless network; and receiving, by the apparatus from a provisioning server of the service provider, provisioning of instructions to be executed by the apparatus to perform an authentication exchange that is compatible with a network entry scheme where the credentials are entered by the user, wherein said receiving the provisioning further includes configuring a parameter of the apparatus to a user-controlled mode (UC) to indicate that the apparatus is configured to enter the wireless network with the credentials entered by the user;

using, by the apparatus, another authentication exchange to authenticate the apparatus prior to said receiving the message prompting or indicating a creation of credentials, wherein the another authentication exchange is a default that does not allow a user to enter the credentials.

7. The apparatus of claim 6, wherein the instructions, if executed, further result in:

sending, by the apparatus to the provisioning server, a message to start an Open Mobile Alliance Device Management (OMA-DM) session between the apparatus and the provisioning server;

wherein said receiving the message prompting or indicating the creation of credentials and said receiving the provisioning of instructions are performed during the OMA-DM session.

8. The apparatus of claim 6, wherein the authentication exchange is compatible with an Extensible Authentication Protocol Tunneled Transport Layer Security (EAP-TTLS) with a Challenge Handshake Authentication Protocol (CHAP), wherein the instructions, if executed, further result in:

exiting, by the apparatus, the wireless network; and prompting, by the apparatus, the user to enter the credentials to authenticate the apparatus prior to re-connecting the apparatus to the wireless network.

9. The apparatus of claim 6, wherein said receiving the message prompting the creation of credentials comprises receiving, by the apparatus, a prompt for the user of the apparatus to create the credentials via Hypertext Transfer Protocol (HTTP); and wherein the credentials comprise a username and a password.

10. The apparatus of claim 6, wherein said receiving the message indicating the creation of credentials comprises receiving, by the user of the apparatus from the service provider, the credentials using a medium other than a medium that is used to receive control messages to the apparatus from the wireless network;

wherein the credentials comprise a username and a password.

11. A method comprising:

using, by one or more service provider devices, a default authentication exchange to authenticate a mobile station in a wireless network, wherein the default authentication exchange does not allow a user of the mobile station to enter credentials to authenticate the mobile station;

sending, by one or more over-the-air (OTA) servers of a service provider of the wireless network to the mobile station during a subscription process for the mobile station, a message prompting or indicating a creation of credentials to be entered by the user of the mobile station to authenticate the mobile station on re-entry to the wireless network; and provisioning, by a provisioning server of the one or more OTA servers, the mobile station with instructions to be executed by the mobile station to perform an updated authentication exchange where the credentials are entered by the user to authenticate the mobile station, wherein said provisioning the mobile station further comprises configuring a parameter of the mobile station to a user-controlled (UC) mode to indicate that the mobile station is configured to enter the wireless network with the credentials entered by the user.

12. The method of claim 11, further comprising:

subsequent to using the default authentication exchange to authenticate the mobile station and prior to using the default authentication exchange, sending, by one or more service provider devices to the mobile station, an internet protocol (IP) address for the mobile station to establish a data path with the service provider.

13. The method of claim 11, wherein the default authentication exchange is compatible with Extensible Authentication Protocol Transport Layer Security (EAP-TLS);

wherein the updated authentication exchange is compatible with an Extensible Authentication Protocol Tunneled Transport Layer Security (EAP-TTLS) with a Challenge Handshake Authentication Protocol (CHAP).

14. The method of claim 11, further comprising:

receiving, from the mobile station, a message to start or starting an Open Mobile Alliance Device Management (OMA-DM) session between the mobile station and the provisioning server;

wherein said sending the message prompting or indicating the creation of credentials and said provisioning the mobile station are performed during the OMA-DM session; and wherein said configuring the parameter of the mobile station to the user-controlled (UC) mode further comprises selecting the UC mode where the UC mode or a server-controlled (SC) mode can be selected for the parameter, the SC mode not allowing a user of the mobile station to enter the credentials to enter the wireless network.

15. The method of claim 11, further comprising:
disconnecting, by the provisioning server, the mobile station from the wireless network; and
using the updated authentication exchange to authenticate the mobile station prior to re-connecting the mobile station to the wireless network, wherein the updated authentication exchange uses the credentials entered by the user.

16. The method of claim 11, wherein said sending the message prompting or indicating the creation of credentials respectively comprises prompting the user of the mobile station to create the credentials via Hypertext Transfer Protocol (HTTP) or sending the credentials to the user using a medium other than a medium that is used to transmit control messages to the mobile station for the wireless network;
wherein the credentials comprise a username and a password.

* * * * *